US012363524B2

(12) United States Patent
Shaheen

(10) Patent No.: US 12,363,524 B2
(45) Date of Patent: Jul. 15, 2025

(54) IP-BASED SYSTEM SUPPORTING multi-USIMs

(71) Applicant: SHARP KABUSHIKI KAISHA, Sakai (JP)

(72) Inventor: Kamel M. Shaheen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 418 days.

(21) Appl. No.: 17/918,883

(22) PCT Filed: Apr. 14, 2021

(86) PCT No.: PCT/JP2021/015426
§ 371 (c)(1),
(2) Date: Oct. 13, 2022

(87) PCT Pub. No.: WO2021/210601
PCT Pub. Date: Oct. 21, 2021

(65) Prior Publication Data
US 2023/0276223 A1    Aug. 31, 2023

Related U.S. Application Data

(60) Provisional application No. 63/012,033, filed on Apr. 17, 2020.

(51) Int. Cl.
*H04W 8/18* (2009.01)
*H04W 60/00* (2009.01)
*H04W 88/06* (2009.01)

(52) U.S. Cl.
CPC ......... *H04W 8/183* (2013.01); *H04W 60/005* (2013.01); *H04W 88/06* (2013.01)

(58) Field of Classification Search
CPC ..... H04W 12/06; H04W 8/183; H04W 88/06; H04W 60/00; H04W 12/08; H04W 8/18;
(Continued)

(56) References Cited

U.S. PATENT DOCUMENTS

2021/0314858 A1* 10/2021 Wong .................... H04W 88/16

FOREIGN PATENT DOCUMENTS

WO    WO-2021043417 A1 *  3/2021  .......... H04W 60/005

* cited by examiner

*Primary Examiner* — Khalid W Shaheed
(74) *Attorney, Agent, or Firm* — ScienBiziP, P.C.

(57) ABSTRACT

A user equipment (UE) for wireless communication includes one or more non-transitory computer-readable media having computer-executable instructions embodied thereon, at least one processor coupled to the one or more non-transitory computer-readable media, and configured to execute the computer-executable instructions to: detect, by a multiple-universal subscriber identity module (multi-USIM) application of the UE at a Mobile Terminal (MT) level, a presence of a first USIM belonging to a first core network and a second USIM belonging to a second core network, and send an Internet Protocol (IP)-based multi-USIM registration message to an IP-based multi-USIM server or Application Function (AF), where the IP-based multi-USIM registration message comprises at least one of an indication of the presence of the first and second USIMs, information pertaining to identification, connectivity and preference information of the UE, and capabilities associated with the first and the second USIMs.

6 Claims, 11 Drawing Sheets

(58) Field of Classification Search
CPC ....... H04W 12/72; H04W 8/205; H04W 4/50; H04W 8/04
See application file for complete search history.

IP-BASED SYSTEM SUPPORTING multi-USIMs

TECHNICAL FIELD

The present disclosure generally relates to wireless communication, and more particularly, to multiple-universal subscriber identity module (M-USIM/MUSIM) user equipment (UE) operations.

BACKGROUND ART

In wireless communication systems, support for multi-USIM in a UE is handled in an implementation-specific manner without any support from 3rd Generation Partnership Project (3GPP) specifications, resulting in a variety of implementations and UE behaviors. In a multi-USIM device, the USIMs typically share common radio and baseband components. Thus, the multi-USIM device may register in different networks but using one radio front-end (RF) and base band.

In the next generation (e.g., fifth generation (5G) new radio (NR)) wireless communication networks, a multi-USIM UE is expected to be in Radio Resource Control (RRC) Connected state with only one network at a time, while being able to receive paging, perform signal measurements, or read system information, and determine if it needs to respond to paging requests from other networks. With a single RF plate-form, however, the UE must listen to paging of the other connection(s), and the network needs to be aware of the multi-registration scenario. When a UE is paged on a second system while connected to a first system, the paged UE may drop the connection on the first system and attempt to access the second system without releasing the first connection due to lack of time to switch systems. Such behaviors can cause performance degradations and reductions in overall system capacity.

On the network end, the current network systems remain ignorant of the UEs' capability to support multiple USIMs. In order to support multi-USIM UEs, the network systems need to be aware of such capabilities in order to coordinate the operations of multi-USIM registrations, potential simultaneous operations and collision avoidance.

Thus, there is a need in the art for multi-USIM UE and multi-network coordination.

SUMMARY OF INVENTION

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: detect, by a multiple-universal subscriber identity module (multi-USIM) application of the UE at a Mobile Terminal (MT) level, a presence of a first USIM belonging to a first core network and a second USIM belonging to a second core network; send an Internet Protocol (IP)-based multi-USIM registration message to an IP-based multi-USIM server or Application Function (AF); wherein the IP-based multi-USIM registration message comprises at least one of: an indication of the presence of the first and second USIMs, information pertaining to identification, connectivity and preference information of the UE, and capabilities associated with the first and the second USIMs.

In one example, a method by a user equipment (UE) for wireless communication, the method comprising: detecting, by a multiple-universal subscriber identity module (multi-USIM) application of the UE at a Mobile Terminal (MT) level, a presence of a first USIM belonging to a first core network and a second USIM belonging to a second core network; sending an Internet Protocol (IP)-based multi-USIM registration message to an IP-based multi-USIM server or Application Function (AF); wherein the IP-based multi-USIM registration message comprises at least one of: an indication of the presence of the first and second USIMs, information pertaining to identification, connectivity and preference information of the UE, and capabilities associated with the first and the second USIMs.

In one example, an Internet Protocol (IP)-based multiple-universal subscriber identity module (multi-USIM) server or Application Function (AF) comprising: one or more non-transitory computer-readable media having computer-executable instructions embodied thereon; at least one processor coupled to the one or more non-transitory computer-readable media, and configured to execute the computer-executable instructions to: receive an IP-based multi-USIM registration message from a user equipment (UE); wherein the IP-based multi-USIM registration message comprises at least one of: an indication of the presence of a first USIM and a second USIM, information pertaining to identification, connectivity and preference information of the UE, and capabilities associated with the first and the second USIMs.

In one example, a method by an Internet Protocol (IP)-based multiple-universal subscriber identity module (multi-USIM) server or Application Function (AF), the method comprising: receiving an IP-based multi-USIM registration message from a user equipment (UE); wherein the IP-based multi-USIM registration message comprises at least one of: an indication of the presence of a first USIM and a second USIM, information pertaining to identification, connectivity and preference information of the UE, and capabilities associated with the first and the second USIMs.

BRIEF DESCRIPTION OF DRAWINGS

Implementations of the present technology will now be described, by way of example only, with reference to the attached figures.

DESCRIPTION OF EMBODIMENTS

Figure 1:
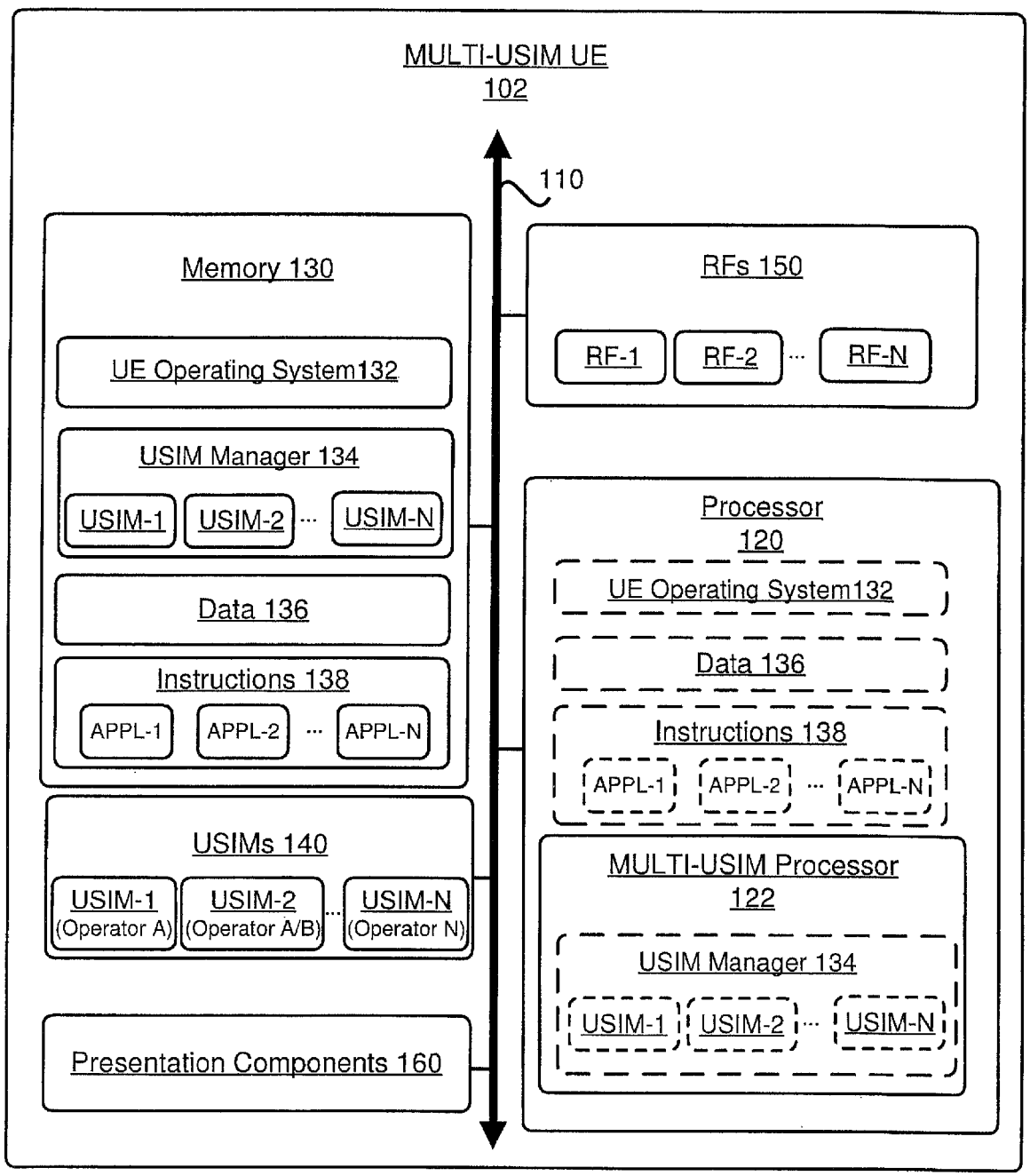
FIG. 1 illustrates a block diagram of a multi-USIM UE, in accordance with various example implementations of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation (5G) communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram of a multi-USIM UE, in accordance with various example implementations of the present disclosure. As shown in FIG. 1, multi-USIM UE 102 may include processor 120, memory 130, multiple USIMs 140, multiple Radio Front-end circuitries (RFs) 150, and one or more presentation components 160. Multi-USIM UE 102 may also include one or more radio frequency spectrum band modules, one or more base station communications modules, one or more network communications modules, and one or more system communications management modules, Input/Output (I/O) ports, I/O components, and power supply (not explicitly shown in FIG. 1). Each of these components may be in communication with each other, directly or indirectly, over one or more buses 110.

In various implementations of the present disclosure, processor 120 (e.g., having processing circuitry) may include an intelligent hardware device, e.g., a Central Processing Unit (CPU), a microcontroller, an ASIC, and etc. Processor 120 may also include memory storage. As illustrated in FIG. 1, processor 120 may be responsible for running UE operating system 132, and processing data 136 and instructions 138 received from memory 130, information through RFs 150, the base band communications module, and/or the network communications module. Processor 120 may also process information to be sent to RFs 150 for transmission to the network communications module for transmission to a core network. In the present implementation, processor 120 may include multi-USIM processor 122 for processing instructions from USIM manager 134 for one or more of USIMs of multi-USIM UE 102, for example.

As illustrated in FIG. 1, memory 130 may store UE operating system 132, USIM manager 134, data 136, and computer-readable, computer-executable instructions 138 (e.g., software codes and/or applications) that are configured to, when executed, cause processor 120 to perform various functions described herein. Alternatively, USIM manager 134 and/or instructions 138 may not be directly executable by processor 120 but be configured to cause multi-USIM UE 102 (e.g., when compiled and executed) to perform various functions described herein. In various implementations of the present application, instructions 138 may include at least one Internet Protocol (IP)-based applications that may detect at the Mobile Terminal (MT) level the presence of multiple USIMs in multi-USIM UE 102, and register multi-USIM UE 102 with an IP-based multi-USIM server or Application Function (AF) (MUSIM AF). The application may also receive and respond to IP-based paging messages from the MUSIM AF.

The IP-based paging messages may include specific commands which inform and notify the IP-based application that a specific action is required. One example action may be to alert the IP-based application that a service delivery is waiting for the UE on another network (e.g., network B) associated with USIM-2, while the UE is attached to or camping on a preferred network (e.g., network A) associated with USIM-1. In one implementation, the IP-based application based on the configuration may trigger the activation of USIM-2 based elements (e.g., MT and TE) including radio resources and activation of various protocols (AS and NAS) and states associated with USIM-2. Also, while the UE is responding to the service delivery using USIM-2 based elements, the UE may also manage the MT and TE associated with USIM-1 to perform certain tasks to maintain connectivity toward network A. In some implementations, the IP-based application may trigger the UE to switch to the other system/network which is supported by USIM-2, which may require the switching of Radio resources to the network associated with USIM-2 and accessing the network by establishing an RRC connection if one is not maintained during the preferred mode. The activation of IP connectivity in some implementations may enable the UE to receive IP-based messages from the MUSIM AF/server directly. In another implementation, depending on the information included in the IP-based paging messages, the IP-based application may decide to ignore the notification.

In various implementation of the present disclosure, memory 130 may include a variety of computer-readable media. Computer-readable media may be any available media that may be accessed by multi-USIM UE 102 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various implementation of the present disclosure, memory 130 may include computer-storage media in the form of volatile and/or non-volatile memory. Memory 130 may be removable, non-removable, or a combination thereof. Example memory includes solid-state memory, hard drives, optical-disc drives, and etc.

As illustrated in FIG. 1, multi-USIM UE 102 may include multiple USIMs 140, such as USIM-1, USIM-2, through USIM-N. Each of USIM-1 through USIM-N may belong to a same or different network/operator (e.g., Public Land Mobile Network (PLMN)). It should be noted that, although USIMs are described in the present implementation and various implementations of the present disclosure, other subscriber identity modules or subscriber identification modules (e.g., SIMs) can also be used.

As shown in FIG. 1, multi-USIM UE 102 may include multiple RFs 150, such as RF-1, RF-2, through RF-N. Each of the RFs 150 may include a transmitter (e.g., transmitting/transmission circuitry) and a receiver (e.g., receiving/reception circuitry). In some implementations of present disclosure, RF-1, RF-2, through RF-N of RFs 150 may respectively correspond to USIM-1, USIM-2, through USIM-N, where USIM-1, USIM-2, through USIM-N may transmit and/or receive data and control channels, for example, through RF-1, RF-2, through RF-N, respectively.

As shown in FIG. 1, multi-USIM UE 102 may include presentation components 160 for presenting data indications to a person or other device. Examples of presentation components 160 may include a display device, speaker, printing component, vibrating component, etc.

Figure 2:
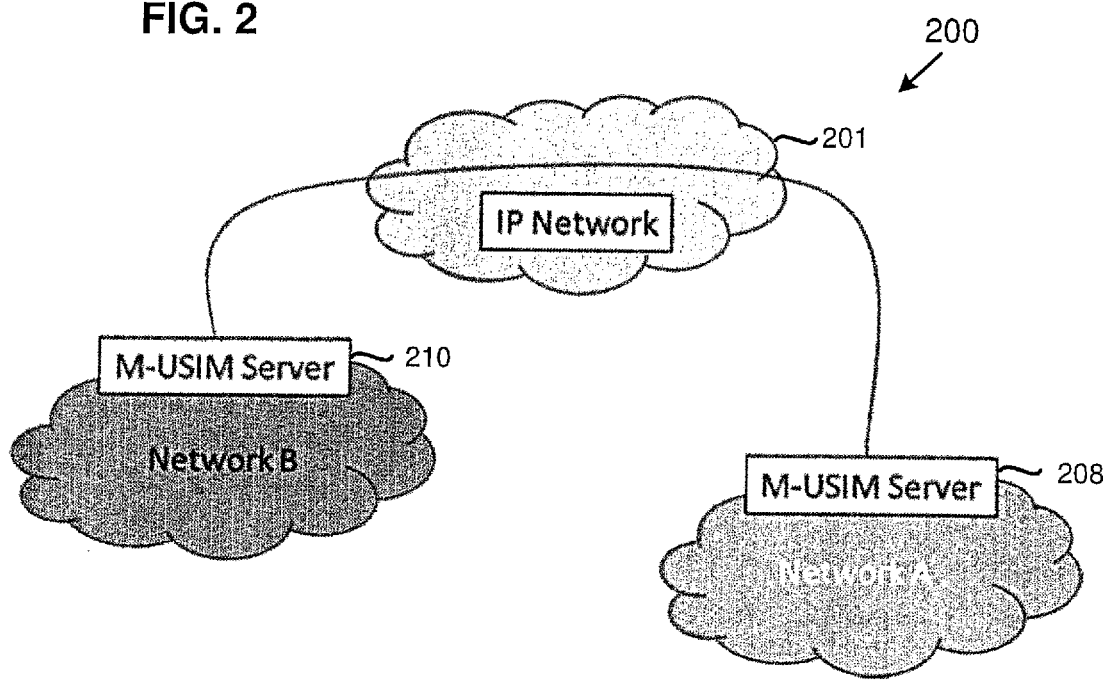
FIG. 2 illustrates a schematic diagram of an example network architecture, in accordance with an example implementation of the present disclosure.

FIG. 2 is schematic diagram illustrating an example network architecture 200 having network A and network B connected through an IP based network in accordance with an example implementation of the present disclosure. Network A may include IP-based M-USIM server or AF (MUSIM AF) 208. Network B may also include IP-based M-USIM server or AF (MUSIM AF) 210. MUSIM AFs 208 and 210 may communicate with each other through IP-based network 201, for example, via IP-based connections. In one or more implementations of the present application, at least one of network A and network B may be accessible by a UE through the IP-based connections in the user plane and the traffic (e.g., data) may be transparent to base stations.

Figure 3:
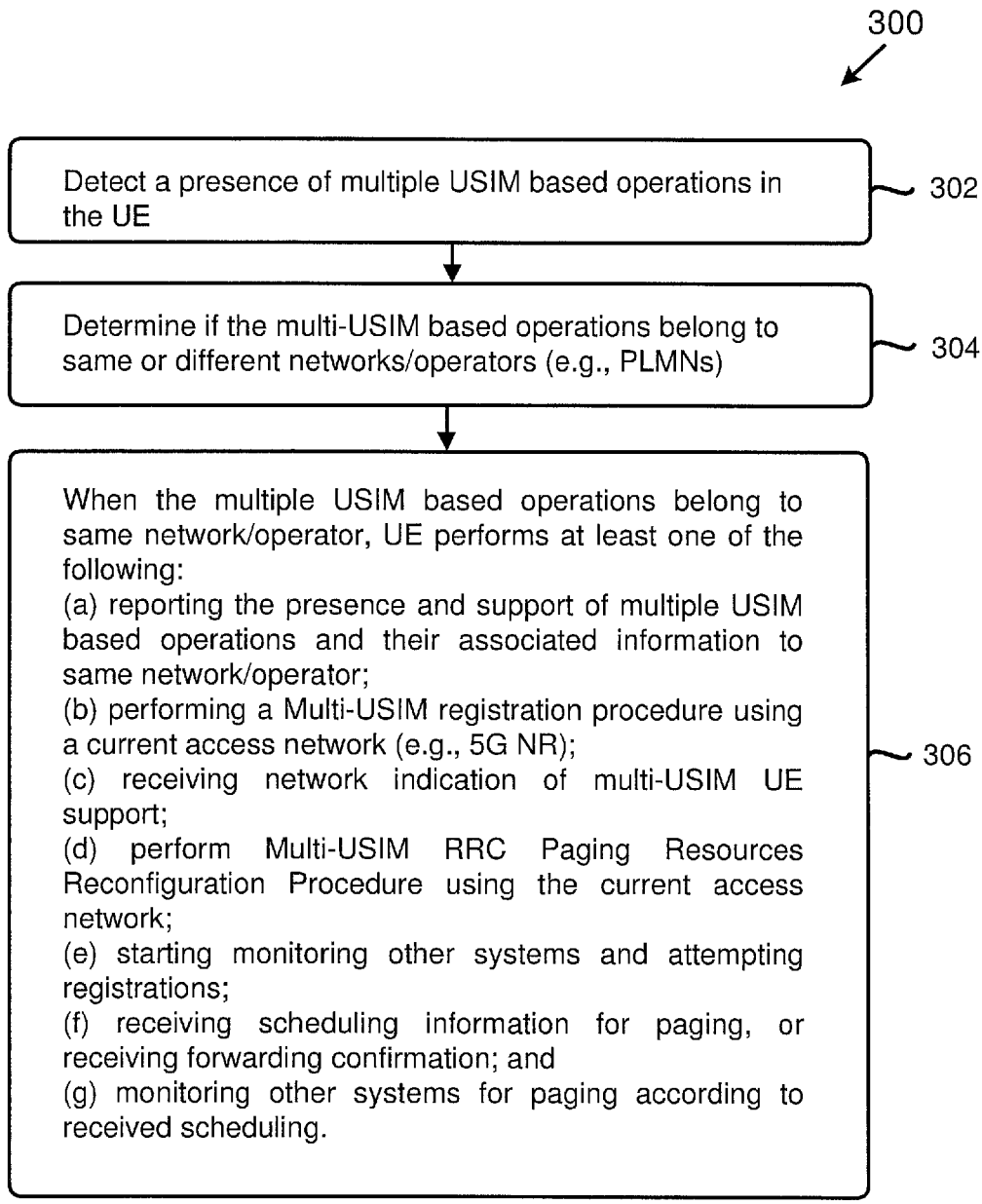
FIG. 3 illustrates a flowchart diagram illustrating a method of a UE for performing multi-USIM registration in a communication network, in accordance with example implementations of the present disclosure.

FIG. 3 is a flowchart diagram illustrating a method of a UE for performing multi-USIM registration in a communication network, in accordance with example implementations of the present disclosure. As illustrated in FIG. 3, flowchart 300 may include actions 302, 304, and 306. In one implementation, the UE described in flowchart 300 may correspond to multi-USIM UE 102 in FIG. 1.

In one or more implementations, in action 302, the UE may detect a presence of multiple USIMs in the UE. In one implementation, before the UE is powered on, two or more USIMs are inserted into the USIM card slots of the UE, for example. When the UE is powered on, the UE (e.g., through multi-USIM processor 122 and USIM manager 134 in FIG. 1) may detect the presence of the multiple USIMs. In another implementation, the UE is initially powered on with a first USIM, and a second USIM is later inserted into the UE. The UE (e.g., through multi-USIM processor 122 and USIM manager 134 in FIG. 1) may detect the second USIM while the UE is operating with the first USIM already registered with the network.

In action 304, the UE may determine if the multiple USIMs belong to a same network/operator. In one implementation, the UE may check the operator IDs (e.g., PLMN IDs) associated with the USIMs in the UE to determine if the multiple USIMs belong to the same network/operator. For example, when the PLUM IDs of the USIMs are the same, then the multiple USIMs belong to the same network/operator.

In action 306, when the multiple USIMs belong to the same network/operator, the UE may send a message, using one of the USIMs (e.g., a preferred USIM) and a preferred access network system associated with the selected USIM, to the network/operator. The message may indicate to the network/operator that there are multiple USIMs present (or active) in the UE. The message may also indicate or include the associated capabilities of each USIM. In some implementations, the message may include, for example, Non-Access Stratum (NAS) capabilities (e.g., notification forwarding, etc.) associated with each of the USIMs. In some implementations, the message may include, for example, Access Stratum (AS) capabilities (e.g., single transmitter, dual-reception radio, etc.) associated with each of the USIMs. In some implementations, a multi-USIM registration procedure may be performed using an access network (e.g., 5G NR, LTE/UTRAN, etc.). In some implementations, the UE may perform Multi-USIM RRC Paging Resources Reconfiguration Procedure using the current access network, monitor other systems and attempting registrations, receive scheduling information for paging or receive forwarding confirmation, or monitor other systems for paging according to received scheduling.

Figure 4:
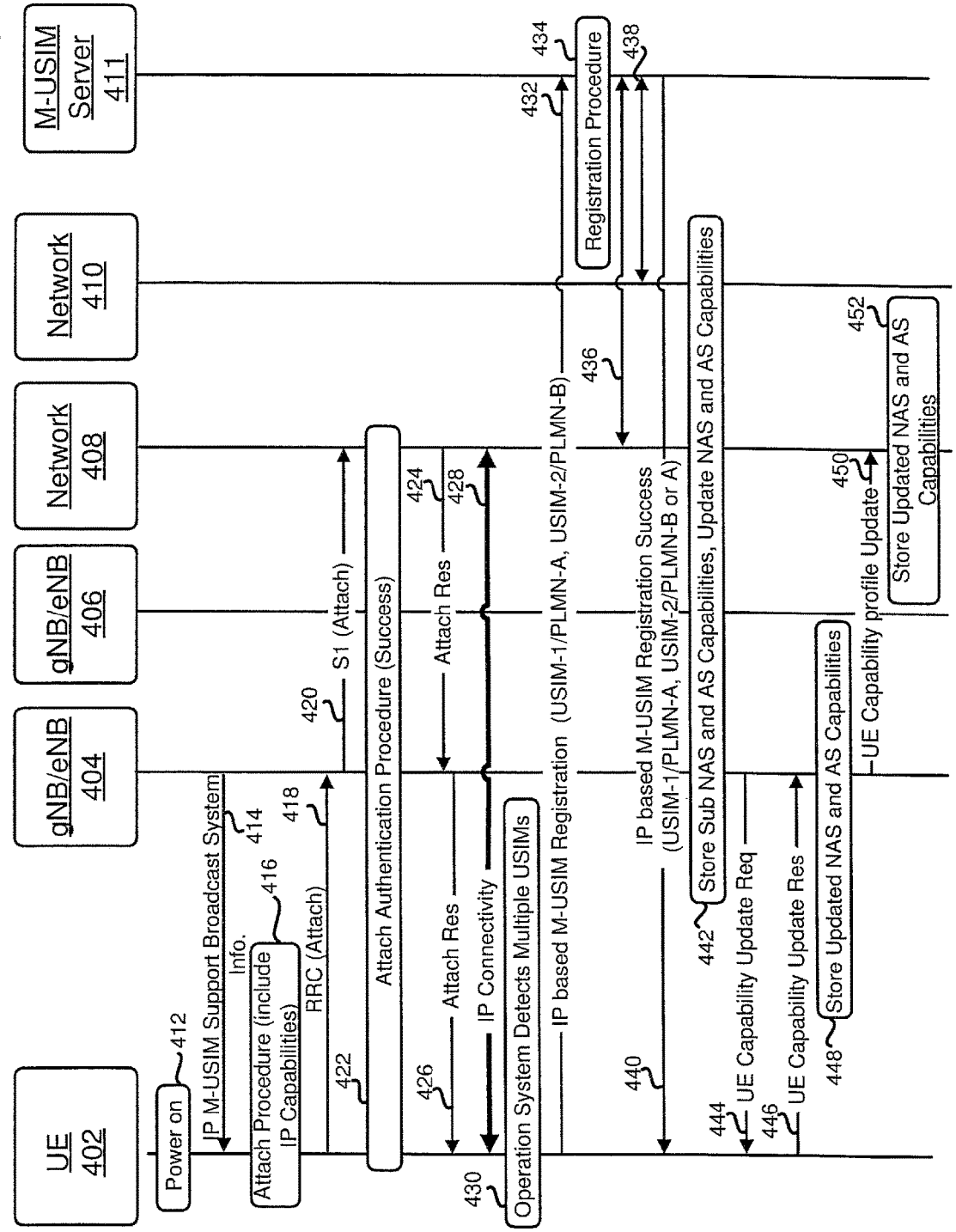
FIG. 4 illustrates a signaling sequence diagram for schematically illustrating a method of registering a multi-USIM UE with a MUSIM Server (AF) via IP-based registration procedures, in accordance with example implementations of the present disclosure.

FIG. 4 is a signaling sequence diagram for schematically illustrating a method of registering a multi-USIM UE with an IP-based MUSIM Server or AF (hereinafter "MUSIM AF") via an IP-based registration procedure, in accordance with example implementations of the present disclosure.

As shown in FIG. 4, in diagram 400, UE 402 may report the multi-USIM presence and the capabilities associated with the each USIM, and register the USIMs to an IP-based MUSIM AF (e.g., M-USIM Server 411) via Network 408 (e.g., Network A), Network 410 (e.g., Network B), next generation Node B (gNB) 404 and gNB 406, for example, through one or more of actions 412, 414, 416, 418, 420, 422, 424, 426, 428, 430, 432, 434, 436, 438, 440, 442, 444, 446, 448, 450, and 452. In one implementation, UE 402 described in diagram 400 may correspond to multi-USIM UE 102 in FIG. 1. It should be noted that in one or more implementations, UE 402 may include and support one or more USIMs belonging to same or different operations (e.g., PLMN A/B). In some implementations, at least one of gNB 404 and gNB 406 may be an eNB. In the present implementation, gNB/eNB 404 may be associated with Network 408, while gNB/eNB 406 may be associated with Network 410.

In one or more implementations, in action 412, UE 402 may be powered on. For example, UE 402 is turned on by a user.

In action 414, UE 402 may receive network broadcast information from gNB 404 indicating that gNB 404 supports IP-based multi-USIM operations.

In action 416, UE 402 may initiate an attach procedure. In one implementation, during the attach procedure, UE 402 may report its IP related capabilities associated with USIM-1 to Network 408 through USIM-1 and gNB 404.

In action 418, UE 402 may send an attach request to gNB 404 using USIM-1 via RRC signaling. UE 402 may include AS/NAS capabilities to support certain features.

In action 420, gNB 404 may forward the attach request to Network 408.

In action 422, Network 408 may perform an attach authentication procedure for the USIM-1 of UE 402, then the USIM-1 of UE 402 is authenticated successfully.

In actions 424 to 426, Network 408, via gNB 404, may send an attach procedure response (RES) to UE 402. As such, the attach procedure is complete for USIM-1 of UE 402.

In action 428, UE 402 may establish an IP connection with Network 408.

In action 430, Operation System (e.g., an IP-based application) of UE 402 may detect the presents of multiple USIMs (e.g., USIM-1, USIM-2, etc.). In the present implementation, the IP-based application may detect at the MT level the presence of USIM-1 belonging to Network 408 and USIM-2 belonging to Network 410.

In action 432, UE 402 may send an IP-based multi-USIM registration message to M-USIM Server 411. The IP-based multi-USIM registration message may include at least one of an indication of the presence of multiple USIMs (e.g., USIM-1, USIM-2, etc.), information pertaining to identification, connectivity and preference information of the UE, and capabilities associated with the multiple USIMs. In one implementation, the USIM-1 may be associated with PLMN-A, while the USIM-2 may be associated with PLMN-B. In another implementation, the USIM-1 and USIM-2 may be associated with the same PLMN.

In action 434, M-USIM Server 411 may complete the registration procedure for the USIM-1 upon receiving the IP-based multi-USIM registration message. M-USIM Server 411 may also store the information of UE 402 contained in the IP-based multi-USIM registration message.

In actions 436 and 438, M-USIM Server 411 may inform Network 408 and Network 410 that the IP-based M-USIM registration for USIM-1 is complete. Also, M-USIM Server 411 may inform Network 408 and Network 410 of UE 402's multi-USIM capabilities.

In action 440, M-USIM Server 411 may send an IP-based multi-USIM registration success message to UE 402.

In action 442, gNB 404 and Network 408 may store and update UE 402's profile including sub NAS and AS capabilities. In one implementation, if UE 402 do not include AS/NAS capabilities to support certain features during the attach procedure (e.g., in action 418), Network 408 may request UE 402 to provide such capabilities.

In action 444, gNB 404 may send a UE capability Update request (REQ) to UE 402.

In action 446, UE 402 may send a UE capability Update Response (RES) to gNB 404. The Update Response (RES) may include the UE's NAS and AS capabilities In action 448, gNB 404 may store the updated UE NAS and AS capabilities.

In action 450, gNB 404 may send a UE profile update to Network 408 updating UE 402's NAS and AS capabilities.

In action 452, Network 408 may store the updated UE NAS and AS capabilities.

In one or more implementations, actions 418, 420, 424, and 426 may be performed via at least one of AN and NAS signaling (e.g., RRC-based signaling), and actions 428, 432, 436, 438, 440, 444, 446, and 450 may be performed via at least one of AN and NAS signaling (e.g., RRC-based signaling) and/or IP-based signaling.

Figure 5:
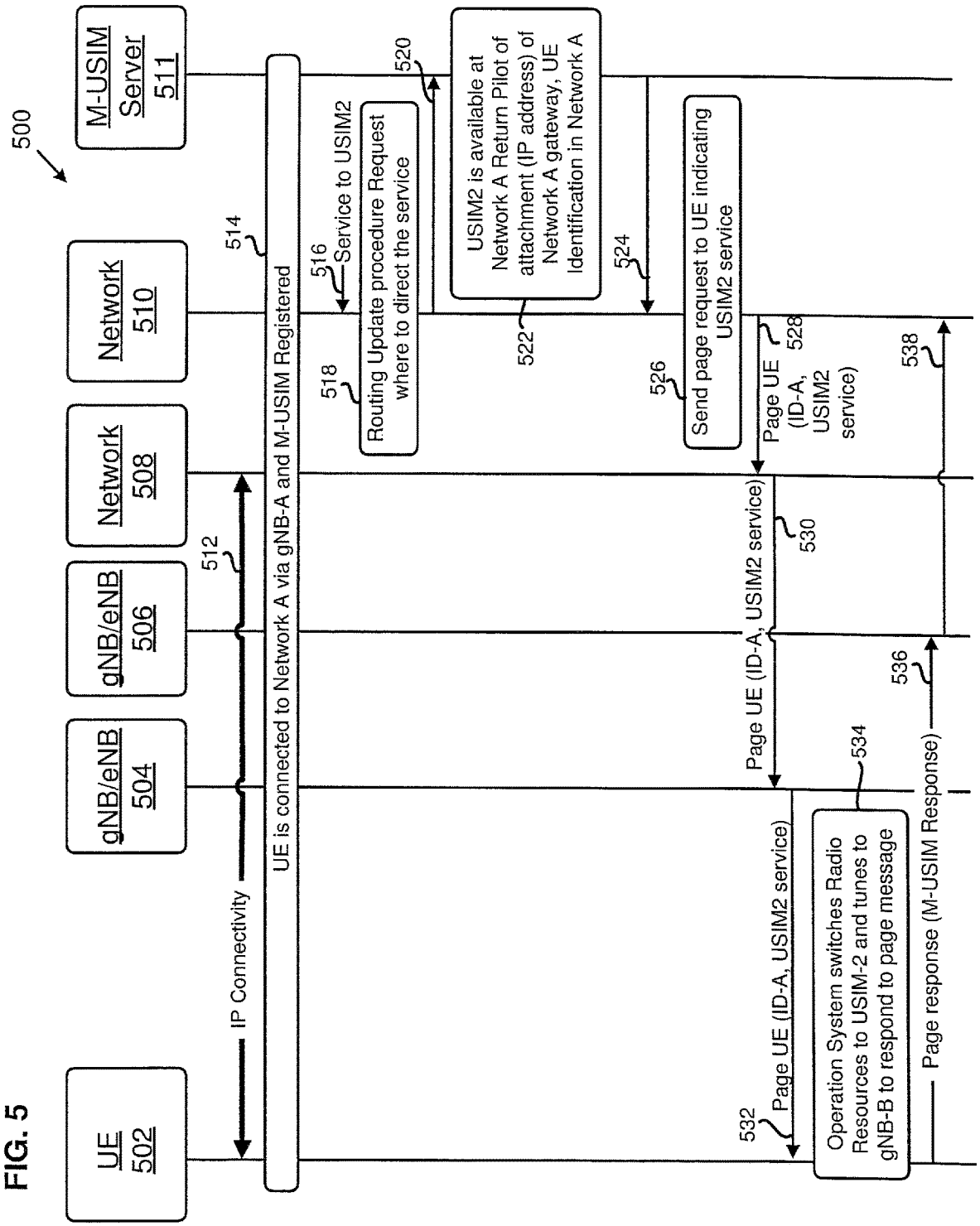
FIG. 5 is a signaling sequence diagram for schematically illustrating a method of a service delivery on a second network using IP connectivity of a first network, in accordance with example implementations of the present disclosure.

FIG. 5 is a signaling sequence diagram for schematically illustrating a method of a service delivery on a second network using IP connectivity of a first network, in accordance with example implementations of the present disclosure.

As shown in FIG. 5, in diagram 500, UE 502 may receive a notification of a service delivery on a second network (e.g., Network 510) using IP connectivity of a first network (e.g., Network 508), for example, through one or more of actions 512, 514, 516, 518, 520, 522, 524, 526, 528, 530, 532, 534, 536, and 538. It should be noted that in one or more implementations, UE 502 may also correspond to multi-USIM UE 102 in FIG. 1 or UE 402 in FIG. 4 which may include and support one or more USIMs belonging to same or different operations (e.g., PLMN A/B). In some implementations, at least one of gNB 504 and gNB 506 may be an eNB. In the present implementation, gNB/eNB 504 may be associated with Network 508, while gNB/eNB 506 may be associated with Network 510.

In one or more implementations, in action 512, UE 502 may establish an IP connection with Network 508 similarly to action 428 in FIG. 4. In one or more implementations, the attach procedure and authentication procedure for USIM-1 (e.g., similar to actions 412-426 in FIG. 4) are completed before action 512 initiates.

In action 514, UE 502 may establish a connection (e.g., an RRC connection) with Network 508 via gNB 504 and have completed M-USIM registration with M-USIM Server 511. In one or more implementations, action 514 may include actions similar to actions 430-452 in FIG. 4.

In action 516, M-USIM Server 511 may receive a service request (e.g., a service call) of a pending service delivery for a USIM-2 based MT associated with USIM-2 of the UE 502 (e.g., application therein), while UE 502 is camped on Network 508 via gNB 504 using USIM-1.

In action 518, Network 510 may prepare an IP-based routing update procedure request requesting destination of the service request for USIM-2.

In action 520, Network 510 may send the IP-based routing update procedure request to M-USIM Server 511 requesting routing information for the service request for the USIM-2.

In action 522, M-USIM Server 511 may determine that USIM-2 is available in Network 508, and prepare routing information including return pilot of attachment, gateway (e.g., IP address, etc.) to UE 502 in Network 508, and UE 502's identification (ID) in Network 508.

In action 524, M-USIM Server 511 may send the routing information to Network 510 indicating that the service request for the USIM-2 may be sent to UE 502 via UE 502's current access network (e.g., Network 508).

In actions 526, Network 510 may prepare and send an IP-based page request to Network 508.

In actions 530-532, Network 510 may send an IP-based page request indicating the service for the USIM-2 to UE 502 directly through IP-based paging. In one implementation, Network 510 may send an IP-based page request indicating the service for the USIM-2 to UE 502 via gNB 504 through RRC-based paging when an IP connection between UE 502 and Network 508 is not available or based on system configuration and operator preferences.

In action 534, Operation System (e.g., application) of UE 502 may switch radio resources to the USIM-2 and tune to gNB 506 in order to respond to the page request. For example, upon receiving the IP-based paging message, the IP-based application of UE 502 may trigger the activation of USIM-2 based elements (e.g., MT and TE) including radio resources and activation of various protocols (AS and NAS) and states associated with USIM-2, in order to response to the service request using USIM-2 associated with Network 510.

In actions 536 and 538, UE 502 may send a page response to Network 510 via gNB 506 using USIM-2.

In some implementations, actions 516, 520, 524, 528, 530, and 532 may be performed via IP-based signaling, and actions 536 and 538 may be performed via RRC-based signaling. In some implementation, actions 516, 520, 524, 528, 530, and 532 may also be performed via RRC signaling when IP connections are not available or based on system configuration and operator preferences.

Figure 6:
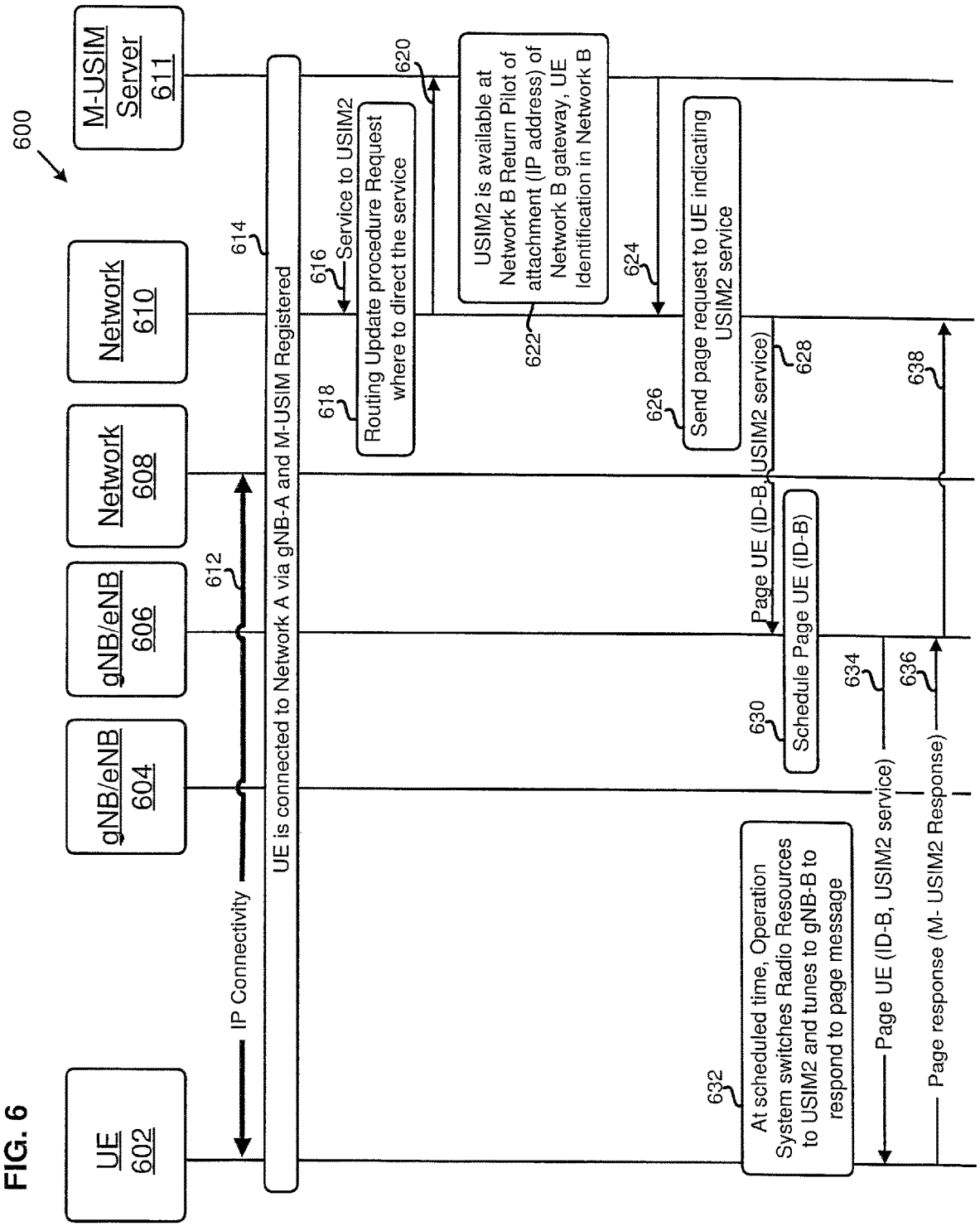
FIG. 6 is a signaling sequence diagram for schematically illustrating a method of a service delivery on a second network using RRC scheduled paging, in accordance with example implementations of the present disclosure.

FIG. 6 is a signaling sequence diagram for schematically illustrating a method of a service delivery on a second network using RRC scheduled paging, in accordance with example implementations of the present disclosure.

As shown in FIG. 6, in diagram 600, UE 602 may receive a notification of a service delivery on a second network (e.g., Network 610) using RRC scheduled paging in the second network (e.g., Network 610), through one or more of actions 612, 614, 616, 618, 620, 622, 624, 626, 628, 630, 632, 634, 636, and 638. It should be noted that in in one or more implementations, UE 602 described in diagram 600 may correspond to multi-USIM UE 102 in FIG. 1, UE 402 in FIG. 4, and UE 502 in FIG. 5 which may include and support one or more USIMs belonging to same or different operations (e.g., PLMN A/B). In some implementations, at least one of gNB 604 and gNB 606 may be an eNB. In the present implementation, gNB/eNB 604 may be associated with Network 608, while gNB/eNB 606 may be associated with Network 610.

In one or more implementations, in action 612, UE 602 may establish an IP connection with Network 608 similarly to action 428 in FIG. 4. In one or more implementations, the attach procedure and authentication procedure for USIM-1 (e.g., similar to actions 412-426 in FIG. 4) are completed before action 612 initiates.

In action 614, UE 602 may establish a connection (e.g., an RRC connection) with Network 608 via gNB 604 and have completed M-USIM registration with M-USIM Server 611. In one or more implementations, action 614 may include actions similar to actions 430-452 in FIG. 4.

In action 616, M-USIM Server 611 may receive a service request (e.g., a service call) of a pending service delivery for a USIM-2 based MT associated with USIM-2 of the UE 602 (e.g., application therein), while UE 602 is camped on Network 608 via gNB 604 using USIM-1.

In action 618, Network 610 may prepare an IP-based routing update procedure request requesting destination of the service request for USIM-2.

In action 620, Network 610 may send the IP-based routing update procedure request to M-USIM Server 611 requesting routing information for the service request for the USIM-2.

In action 622, M-USIM Server 611 may determine that USIM-2 is available in Network 608, and prepare routing information including return pilot of attachment, gateway (e.g., IP address, etc.) to UE 602 in Network 608, and UE 502's identification (ID) in Network 608. M-USIM Server 611 may also prepare RRC-based paging information associated with USIM-2 and Network 610.

In action 624, M-USIM Server 611 may send the routing information to Network 610 indicating that the service request for the USIM-2 may be sent to UE 602 via UE 602's current access network (e.g., Network 608) or alternatively through Network 610.

In action 626, Network 610 many prepare an RRC-based paging request indicating the service for the USIM-2 to UE 602 via Network 610 and gNB 606.

In action 628, Network 610 may send the RRC-based paging request to UE 602 to gNB 606.

In action 630, gNB 606 may prepare to send the RRC-based paging request to USIM-2 of UE 602 during predetermined times to UE 602.

In action 632, Operation System (e.g., application) of UE 502 may switch radio resources to USIM-2 and tune to gNB 606 for receiving information from gNB 606 at the predetermined scheduled times.

In actions 634, gNB 606 may send the page request for the USIM-2 to UE 602 to USIM-2 during one or more of the predetermined scheduled times.

In actions 636 and 638, UE 602 may send a page response to Network 610 via gNB 606 using USIM-2.

In one or more implementations, actions 616, 620, and 624 may be performed via IP-based signaling, and actions 628, 634, 636, and 638 may be performed via RRC signaling when IP connections are not available or based on system configuration and operator preferences.

Figure 7:
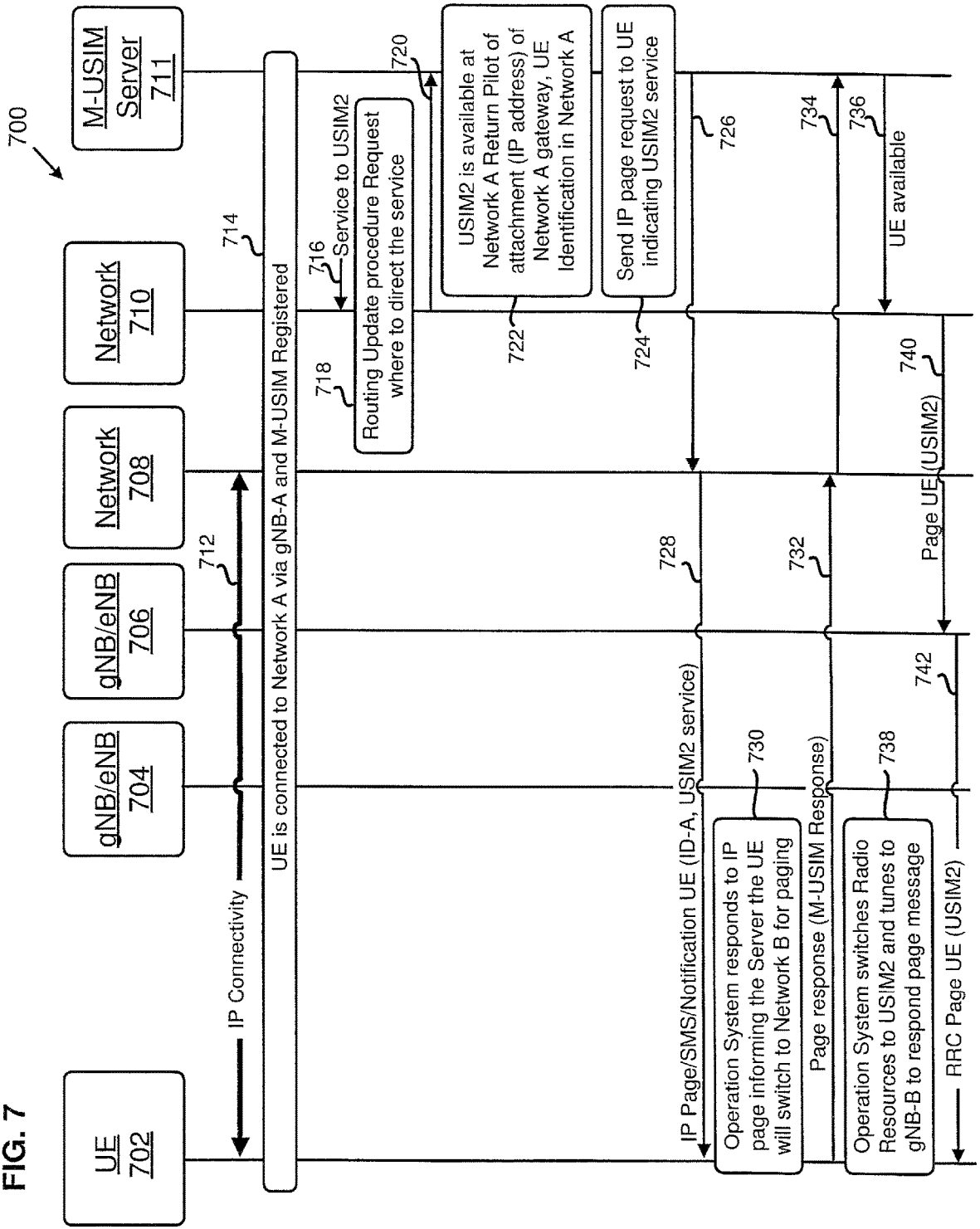
FIG. 7 is a signaling sequence diagram for schematically illustrating a method of a service delivery on a second network using IP connectivity of a first network through AF notification, in accordance with example implementations of the present disclosure.

FIG. 7 is a signaling sequence diagram for schematically illustrating a method of a service delivery on a second network using IP connectivity of a first network through AF notification, in accordance with example implementations of the present disclosure.

As shown in FIG. 7, in diagram 700, UE 702 may receive a notification of a service delivery on a second network (e.g., Network 710) using IP connectivity of a first network (e.g., Network 708), for example, through one or more of actions 712, 714, 716, 718, 720, 722, 724, 726, 728, 730, 732, 734, 736, 738, and 740. It should be noted that in one or more implementations, UE 702 may correspond to multi-USIM UE 102 in FIG. 1 or UE 702 in FIG. 7 which may include and support one or more USIMs belonging to same or different operations (e.g., PLMN A/B). In some implementations, at least one of gNB 704 and gNB 706 may be an eNB. In the present implementation, gNB/eNB 704 may be associated with Network 708, while gNB/eNB 706 may be associated with Network 710.

In one or more implementations, actions 712 through 722 may substantially correspond to actions 512 through 522, respectively, in FIG. 5, the details of which are omitted for brevity.

In action 724, M-USIM Server 711 may prepare the routing information and an IP-based page request for UE 702 indicating the service request for the USIM-2 in Network 710.

In actions 726 and 728, M-USIM Server 711 may send the IP-based page request (e.g., notification) to UE 702 (e.g., application).

In one implementation, M-USIM Server 711 may send an IP-based page request indicating the service for the USIM-2 to UE 702 directly through IP-based paging. In one implementation, M-USIM Server 711 may send an IP-based page request indicating the service for the USIM-2 to UE 702 via Network 710 when a direct IP connection between M-USIM Server 711 and UE 702 is not available or based on system configuration and operator preferences.

In action 730, Operation System (e.g., application) of UE 702 may prepare an IP-based page response to the IP-based page request. The IP-based page response may indicate to M-USIM Server 711 that UE 702 will switch its radio resources to the USIM-2 and tune to gNB 706 in order to receive and respond to the service request from Network 710.

In actions 732 and 734, UE 702 (e.g., application) may send the IP-based page response (e.g., M-USIM Response) to M-USIM Server 711 directly or via Network 708.

In action 736, M-USIM Server 711 may send an IP-based message to Network 710 indicating that USIM-2 of UE 702 is available for paging.

In action 738, upon receiving the IP-based paging message, the IP-based application of UE 702 may trigger the activation of USIM-2 based elements (e.g., MT and TE) including radio resources and activation of various protocols (AS and NAS) and states associated with USIM-2, in order to response to the service request using USIM-2 associated with Network 710.

In actions 740 and 742, Network 710 may send an RRC-based paging message to USIM-2 via gNB 706.

In one or more implementations, actions 716, 720, 726, 728, 732, 734, and 736 may be performed via IP-based signaling, and actions 740 and 742 may be performed via RRC signaling. In another implementation, 716, 720, 726, 728, 732, 734, and 736 may also be performed via RRC signaling when IP connections are not available or based on system configuration and operator preferences.

Figure 8:
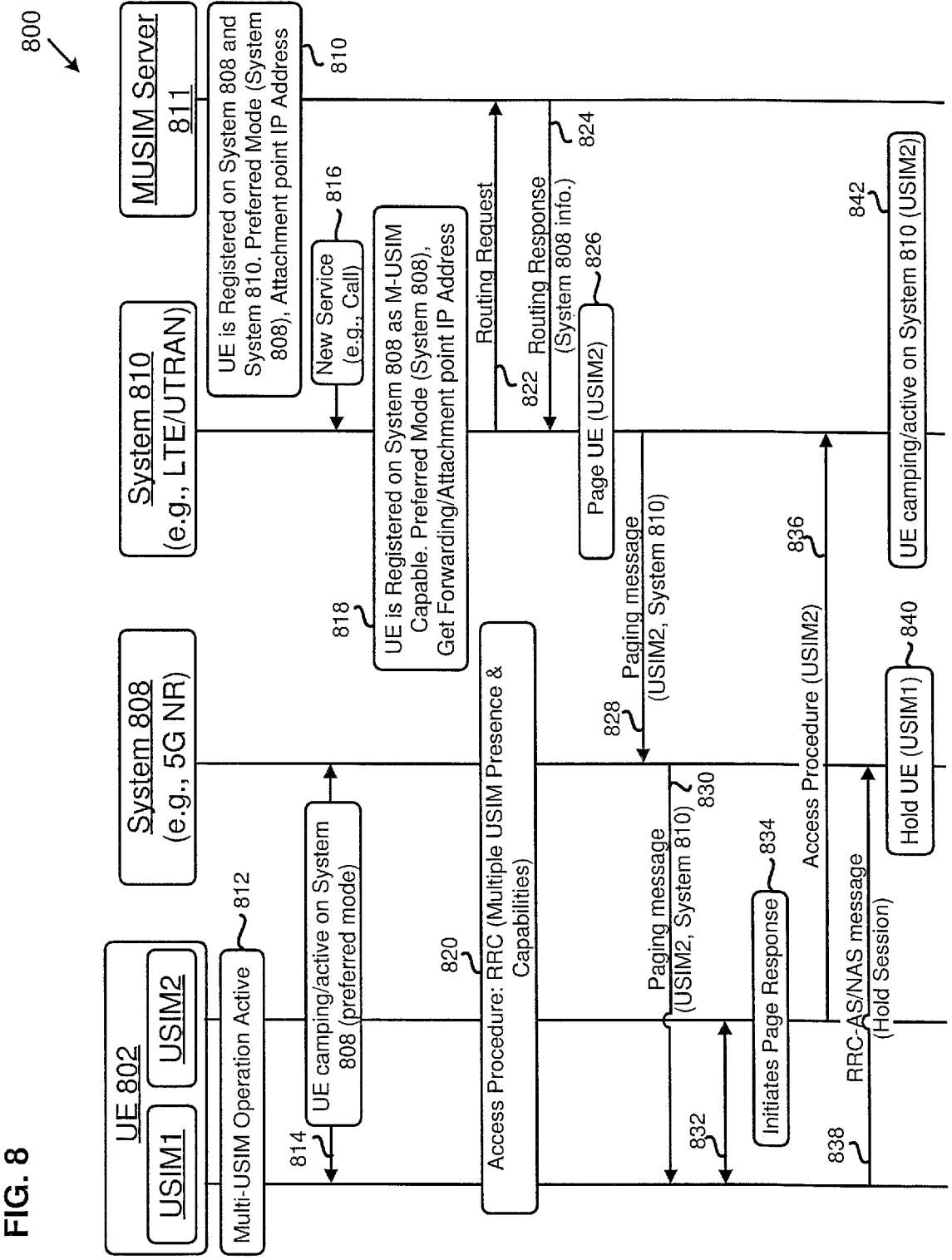
FIG. 8 is a signaling sequence diagram for schematically illustrating a method of a service delivery on a second network using IP- or RRC-based paging in a first system, in accordance with example implementations of the present disclosure.

FIG. 8 is a signaling sequence diagram for schematically illustrating a method of a service delivery on a second network using IP-based or RRC-based paging in a first system, in accordance with example implementations of the present disclosure.

As shown in FIG. 8, in diagram 800, UE 802 may receive a notification of a service delivery on a second system (e.g., System 810) via IP-based or RRC-based paging in System 808, for example, through one or more of actions 810, 812, 814, 816, 818, 820, 822, 824, 826, 828, 830, 832, 834, 836, 838, 840, and 842. It should be noted that in one or more implementations, UE 802 may correspond to multi-USIM UE 102 in FIG. 1 or UE 402 in FIG. 4 which may include and support one or more USIMs belonging to same or different operations (e.g., PLMN A/B). System 808 may include one or more gNBs/eNBs and a core network, while System 810 may include one or more gNBs/eNBs and another core network.

In one or more implementations, in action 812, M-USIM Server 811 may be notified that UE 802 is registered on System 808 and System 810 with the preferred mode (e.g., active in System 808) and Attachment point IP is addressed. In one or more implementations, before action 812 is performed, UE 802 may have established an IP connection with System 808 and completed the attach procedure and Authentication procedure for USIM-1 in a manner similar to action 512 of FIG. 5. Moreover, in one or more implementations, UE 802 may have established an IP connection to System 808, and having completed M-USIM registration in a manner similar to action 514 in FIG. 5.

In action 812, multi-USIM based operation of UE 802 may be active.

In action 814, USIM-1 of UE 802 may be active (e.g., camping) on System 808 (e.g., a preferred mode in the present implementation).

In action 816, System 808 may receive an IP-based notification (e.g., service request) of a pending service delivery for USIM-2 based MT associated with the UE 802 (e.g., application therein).

In action 818, since System 810 is already notified of multi-USIM UE 802's registration on System 808 as M-USIM capable and as the preferred mode, System 810 may prepare routing information including Forwarding or Attachment point IP address, and etc.

In action 820, UE 802 may optionally inform System 808 of UE 802's multi-USIM presence and multi-USIM capabilities through an access procedure (e.g., RRC signaling).

In action 822, System 808 may send an IP-based routing request to M-USIM Server 811 indicating that the service request for USIM-2 may be sent to UE 802 via the current access System (e.g., System 808).

In action 824, M-USIM Server 811 may send an IP-based routing response including System 808 information to System 810.

In action 826, System 810 may prepare a paging message (e.g., IP-based or RRC-based paging message) for USIM-2 of UE 802.

In action 828, System 810 may forward the paging message for USIM-2 to System 808 via IP-based or RRC-based signaling.

In action 830, System 808 may forward the paging message for USIM-2 to USIM-1 via RRC signaling or the IP-based application in UE 802.

In action 832, USIM-1 may forward the paging message to USIM-2. Alternatively, the IP-based application of UE 802 may trigger the activation of USIM-2 based elements (e.g., MT and TE) including radio resources and activation of various protocols (AS and NAS) and states associated with USIM-2, in order to response to the service request using USIM-2 associated with System 810.

In action 834, UE 802 may switch radio resources to USIM-2 and tune to System 810 in order to respond to any paging (e.g., from System 810) to initiate a page response using USMI-2.

In action 836, USIM-2 may initiate an access procedure with System 810.

In action 838, USIM-1 may send an RRC-AS/NAS message to System 808 in order to put an on-going session between USIM-1 and System 808 on hold.

In action 840, System 808 may put the on-going session between USIM-1 and System 808 on hold.

In action 842, UE 802 may access System 810 using USIM-2 to activate the service associated with the service request.

Figure 9:
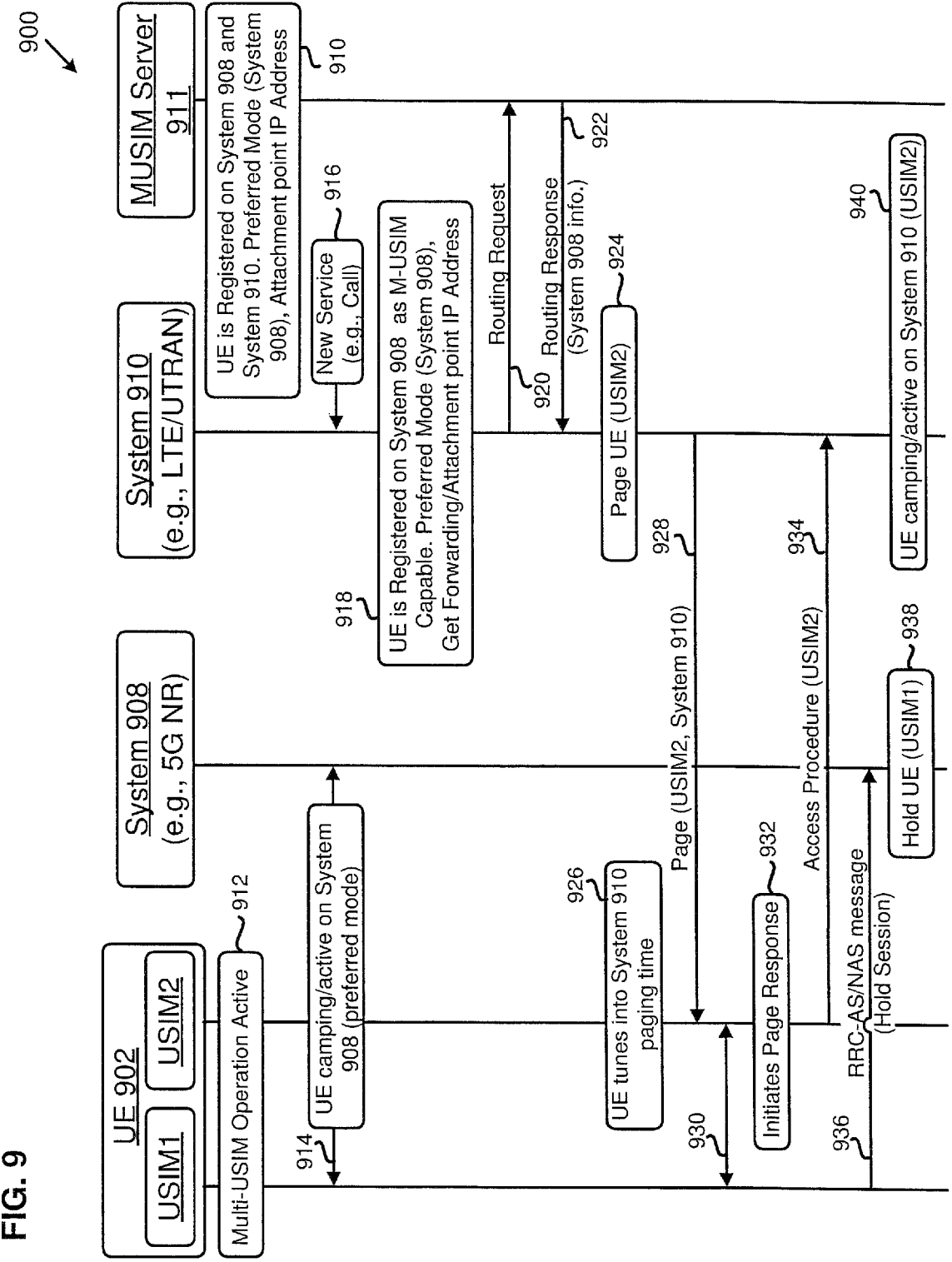
FIG. 9 is a signaling sequence diagram for schematically illustrating a method of a service delivery on a second network using RRC-based paging in the second system, in accordance with example implementations of the present disclosure.

FIG. 9 is a signaling sequence diagram for schematically illustrating a method of a service delivery on a second network using RRC-based paging in the second system, in accordance with example implementations of the present disclosure.

As shown in FIG. 9, in diagram 900, UE 902 may receive a notification of a service delivery on a second system (e.g., System 910) via IP-based or RRC-based paging in System 910, for example, through one or more of actions 912, 912, 914, 916, 918, 920, 922, 924, 926, 928, 930, 932, 934, 936, 938, and 940. It should be noted that in one or more implementations, UE 902 may correspond to multi-USIM UE 102 in FIG. 1 or UE 402 in FIG. 4 which may include and support one or more USIMs belonging to same or different operations (e.g., PLMN A/B). System 908 may include one or more gNBs/eNBs and a core network, while System 910 may include one or more gNBs/eNBs and another core network.

In one or more implementations, actions 912-924 may perform actions in a manner similar to actions 810-818 and 822-826 in FIG. 8, respectively, thus, the details of actions 912-924 are omitted for brevity.

In action 926, UE 902 may switch radio resources to USIM-2 and tune to System 910 for receiving information from System 910 at the predetermined scheduled times.

In action 928, System 910 may send an RRC-based paging message for USIM-2 directly to USIM-2 via RRC signaling.

In action 930, USIM-2 of UE 902 may notify USIM-1 of the paging message.

In action 932, USIM-2 may initiate a page response.

In action 934, USIM-2 may initiate an access procedure with System 910 respond to the service call.

In action 936, USIM-1 may send an RRC-AS/NAS message to System 908 in order to put an on-going session between USIM-1 and System 908 on hold.

In action 938, System 908 may put the on-going session between USIM-1 and System 808 on hold.

In action 940, UE 902 may access System 910 using USIM-2 to activate the service associated with the service request.

Figure 10:
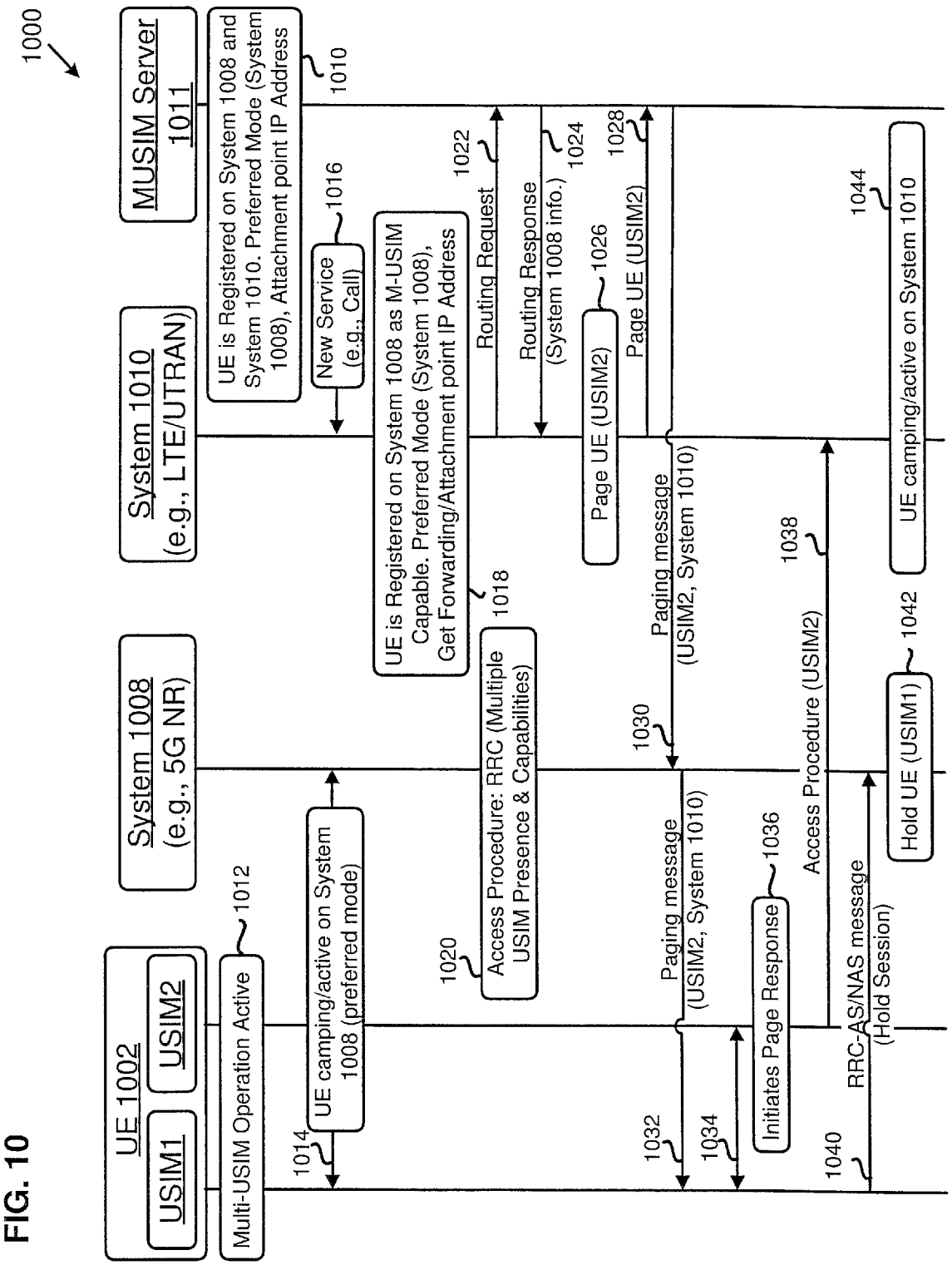
FIG. 10 illustrates a signaling sequence diagram for schematically illustrating a method of a service delivery on a second system using IP-based or RRC-based paging in a first system, in accordance with example implementations of the present disclosure.

FIG. 10 is a signaling sequence diagram for schematically illustrating a method of a service delivery on a second system using IP-based or RRC-based paging in a first system, in accordance with example implementations of the present disclosure.

As shown in FIG. 10, in diagram 1000, UE 1002 receive a notification of a service delivery on a second system (e.g., System 1010) via IP-based or RRC-based paging in System 1008, for example, through one or more of actions 1012, 1012, 1014, 1016, 1018, 1020, 1022, 1024, 1026, 1028, 1030, 1032, 1034, 1036, 1038, 1040, 1042, and 1044. It should be noted that in one or more implementations, UE 1002 may correspond to multi-USIM UE 102 in FIG. 1 or UE 402 in FIG. 4 which may include and support one or more USIMs belonging to same or different operations (e.g., PLMN A/B). System 1008 may include one or more gNBs/eNBs and a core network, while System 1010 may include one or more gNBs/eNBs and another core network.

In one or more implementations, actions 1012-1026 may perform actions in a manner similar to actions action 812-826 in FIG. 8, respectively, thus, the details of actions 1012-1026 are omitted for brevity.

In action 1028, System 1010 may send a paging message (e.g., IP-based or RRC-based paging message) for USIM-2 of UE 1002 to MUSIM Server 1011.

In action 1030, MUSIM Server 1011 may send the paging message for USIM-2 to System 1008 via IP-based signaling.

In action 1032, System 1008 may forward the paging message for USIM-2 to USIM-1 via RRC signaling or the IP-based application in UE 1002.

In action 1034, USIM-1 may forward the paging message to USIM-2. Alternatively, the IP-based application of UE 1002 may trigger the activation of USIM-2 based elements (e.g., MT and TE) including radio resources and activation of various protocols (AS and NAS) and states associated with USIM-2, in order to response to the service request using USIM-2 associated with System 1010.

In action 1036, UE 1002 may switch radio resources to USIM-2 and tune to System 1010 in order to respond to any paging (e.g., from System 1010) to initiate a page response using USMI-2.

In action 1038, USIM-2 may initiate an access procedure with System 1010.

In action 1040, USIM-1 may send an RRC-AS/NAS message to System 1008 in order to put an on-going session between USIM-1 and System 1008 on hold.

In action 1042, System 1008 may put the on-going session between USIM-1 and System 1008 on hold.

In action 1044, UE 1002 may access System 1010 using USIM-2 to activate the service associated with the service request.

Figure 11:
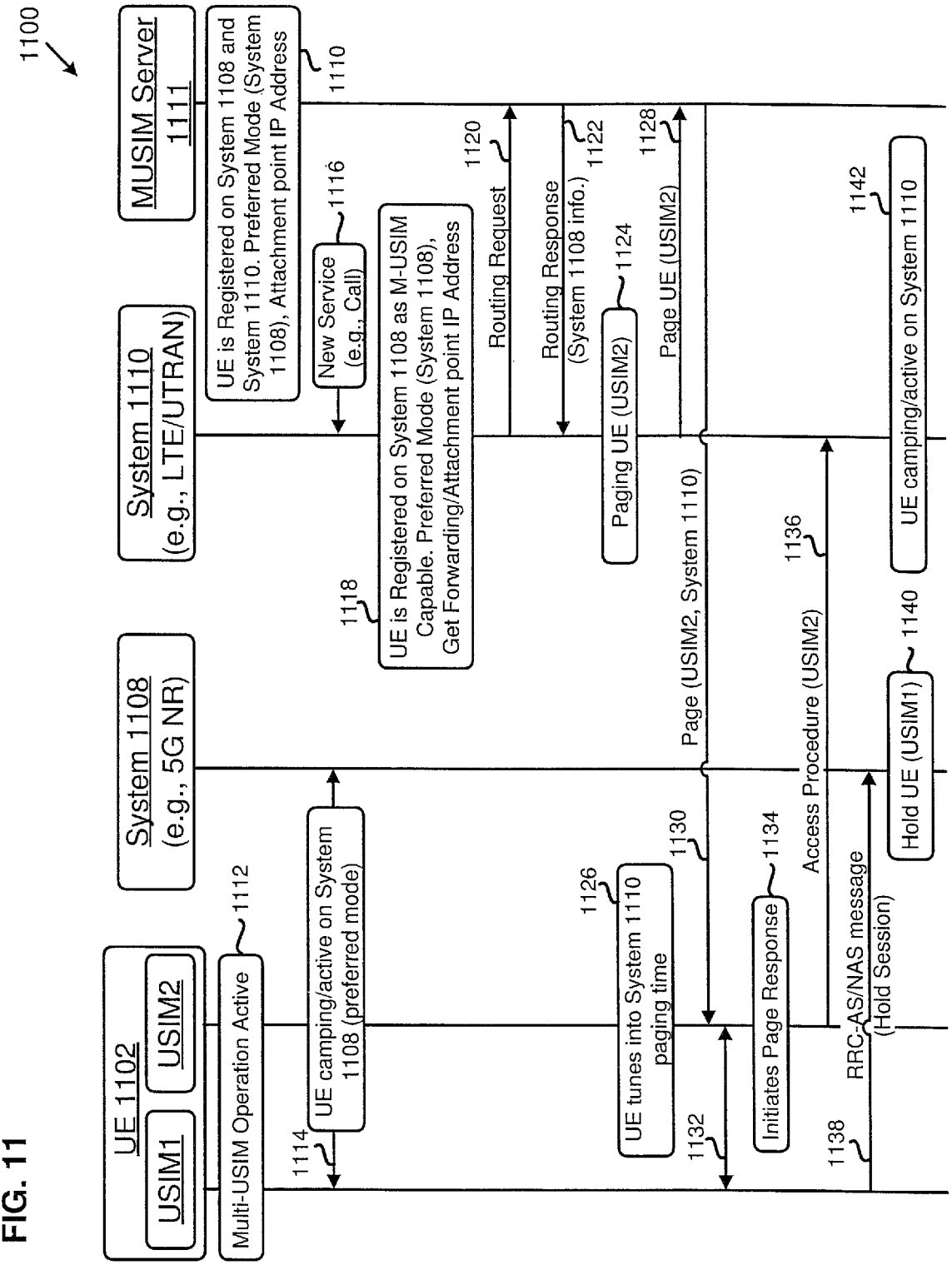
FIG. 11 illustrates a signaling sequence diagram for schematically illustrating a method of a service delivery on a second system using IP connectivity of the second system through AF notification, in accordance with example implementations of the present disclosure.

FIG. 11 is a signaling sequence diagram for schematically illustrating a method of a service delivery on a second system using IP connectivity of the second system through AF notification, in accordance with example implementations of the present disclosure.

As shown in FIG. 11, in diagram 1100, UE 1102 may receive a notification of a service delivery on a second system (e.g., System 1110) using IP connectivity of the second system through AF notification, for example, through one or more of actions 1112, 1114, 1116, 1118, 1120, 1122, 1124, 1126, 1128, 1130, 1132, 1134, 1136, 1138, 1140, 1142, and 1144. It should be noted that in one or more implementations, UE 1102 may correspond to multi-USIM UE 102 in FIG. 1 or UE 402 in FIG. 4 which may include and support one or more USIMs belonging to same or different operations (e.g., PLMN A/B). System 1108 may include one or more gNBs/eNBs and a core network, while System 910 may include one or more gNBs/eNBs and another core network.

In one or more implementations, actions 1112-1124 may perform actions in a manner similar to actions action 1010-1024 in FIG. 10, respectively, thus the details of actions 1112-1124 are omitted for brevity.

In action 1126, UE 1102 may switch radio resources to USIM-2 and tune to System 1110 for receiving information from System 1110 during the predetermined scheduled times.

In action 1128, System 1110 may send a paging message (e.g., IP-based or RRC-based paging message) for USIM-2 of UE 1102 to MUSIM Server 1111.

In action 1130, MUSIM Server 1011 may send the paging message for USIM-2 directly to UE 1102 via IP-based signaling. In another implementation, MUSIM Server 1011 may send an RRC-based page request indicating the service for the USIM-2 to UE 1102 via System 1110, during the predetermined scheduled times, when an IP connections between M-USIM Server 1111 and UE 1102 is not available or based on system configuration and operator preferences.

In action 1132, USIM-2 of UE 1102 may notify USIM-1 of the paging message.

In action 1134, USIM-2 may initiate a page response.

In action 1136, USIM-2 may initiate an access procedure with System 1110 respond to the service call.

In action 1138, USIM-1 may send an RRC-AS/NAS message to System 1108 in order to put an on-going session between USIM-1 and System 1108 on hold.

In action 1140, System 1108 may put the on-going session between USIM-1 and System 808 on hold.

In action 1142, UE 1102 may access System 1110 using USIM-2 to activate the service associated with the service request.

In accordance with various implementations of the present disclosure, the System may indicate support of multiple U-SIM capabilities, multi-USIM paging capabilities, and ability to simultaneously maintain connections to multiple networks. The UE may receive paging from secondary Network while actively operating in current network. The paging may indicate the source network and the priority of the call. The network may allocate paging resources that can be used for both networks. The network may also allocate separate resources for each network. The network may inform the UE with the paging configuration during the initial attachment stage. The UE may configure the paging resources at the serving network and must be able to tune in to receive these resources. UE may be able to maintain RRC and CN state while moving from one system to the other. As such, the network can activate any special features/services/messaging associated with this kind of multi USIM capable UEs.

In accordance with various implementations of the present disclosure, an IP based System may include an IP based server or an application function (AF) to keep track of those UEs with active multiple USIMs. The IP-based server (MUSIM-Server) or MUSIM AF, maintains the different USIM configurations, UE-IDs associated with each USIM, point of attachments: IP address of the gateway where the UE can be contacted, 3GPP serving nodes, preferred mode of delivery.

In accordance with various implementations of the present disclosure, the MUSIM AF (MUSIM-server) may provide the routing information for incoming traffic either directly or indirectly, as shown below in the Figures. The MUSIM-AF may also page the UE over IP to notify the UE of pending service on the secondary USIM as shown below.

In accordance with various implementations of the present disclosure, the MUSIM AF may trigger the 3GPP attach point to trigger NAS/AS RRC-based paging if the UE is not IP reachable (i.e., no IP connection active at the time) based on the stored configuration and latest profile updates. Correspondingly, the UE may indicate support of multiple U-SIM capabilities, Multi-USIM paging capabilities, and ability to simultaneously maintain connections to multiple networks to either or both 3GPP system (using AS/NAS signaling) and/or MUSIM AF (using IP-based signaling). The UE may receive IP page on the preferred USIM indicating of pending service (page) delivery for the secondary USIM. The UE may also tune to the MUSIM paging gaps in order to receive pending pages. The UE may receive paging from secondary Network while actively operating in current network. The paging may indicate the source network and the priority of the call. The network allocates paging resources that can be used for both networks. The network may also allocate separate resources for each network. The network may inform the UE with the paging configuration during the initial attachment stage. The UE may re-configure the paging resources at the serving network by sending RRC Reconfiguration message with M-USIM paging indication requesting the network to update the UE with any modifications and must be able to tune in to the current serving network or the second serving network to receive these resources configurations. The UE may be able to switch network at the particular paging time to check for page on the second system. Alternatively, the UE may receive a page notification on the current serving network (i.e., coordinated service) that a page is being sent over the second system/network. UE may be able to maintain RRC and CN state while moving from one system to the other. This allows the network to activate any special features/services/messaging associated with this kind of multi USIM capable UEs. The UE May report (IP-report to the MUSIM server or 3GPP AS/NAS capability reports) its multiple U-SIM capabilities, presence of two or more USIMs, and capabilities of simultaneous connections to the networks, and indicates its network preference/priority list for the delivery of page notifications in case of coordinated connection. These capabilities can be reported by the MT over IP connection or using 3GPP signaling over AS (RRC) or NAS messages. The Network and UE may be able to maintain RRC, CN, IP connectivity states while moving from one system to the other, the UE may be able to terminate/suspend the service on the primary network while or before operating on the secondary network.

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: detect, by a multiple-universal subscriber identity module (multi-USIM) application of the UE at a Mobile Terminal (MT) level, a presence of a first USIM belonging to a first core network and a second USIM belonging to a second core network; send an Internet Protocol (IP)-based multi-USIM registration message to an IP-based multi-USIM server or Application Function (AF); wherein the IP-based multi-USIM registration message comprises at least one of: an indication of the presence of the first and second USIMs, information pertaining to identification, connectivity and preference information of the UE, and capabilities associated with the first and the second USIMs.

In one example, the UE, wherein the at least one processor is further configured to execute the computer-executable instructions to: receive network broadcast information regarding support of the IP-based multi-USIM server or AF from a first base station associated with the first core network.

In one example, the UE, wherein the at least one processor is further configured to execute the computer-executable instructions to: perform an IP-based discovery of the IP-based multi-USIM server or AF using at least one of an IP-based protocol and a 3rd Generation Partnership Project (3GPP)-based protocol.

In one example, the UE, wherein the at least one processor is further configured to execute the computer-executable instructions to: receive an access stratum (AS) and non-access stratum (NAS) UE capability update request from a first base station associated with the first core network; send a UE capability update response to the first base station for updating the UE's AS and NAS capabilities.

In one example, the UE, wherein the at least one processor is further configured to execute the computer-executable instructions to: receive an IP-based M-USIM registration success message from the IP-based multi-USIM server or AF.

In one example, the UE, wherein the at least one processor is further configured to execute the computer-executable instructions to: receive a notification of a pending service delivery for a second USIM based MT associated with the second USIM; wherein the notification is delivered, via the first core network, using an IP connection between the IP-based multi-USIM server or AF and the UE.

In one example, the UE, wherein the notification is in the form of an IP multimedia message, an IP-based page, a short message service (SMS), or an IP-based protocol notification.

In one example, the UE, wherein the notification is forwarded from the second core network to the first core network.

In one example, the UE, wherein the notification is forwarded from the second core network to the IP-based multi-USIM server or AF which forwards the notification to the first core network.

In one example, the UE, wherein: the notification is forwarded from the second core network to the first core network; and the second core network obtains IP connectivity information of the UE in the first core network and the UE's ID in the first core network from the IP-based multi-USIM server or AF, the IP connectivity information comprising an IP address of a gateway to the UE.

In one example, the UE, wherein the at least one processor is further configured to execute the computer-executable instructions to: switch radio resources to connect to the second core network, at pre-determined time intervals configured during the UE's power-up, to receive notifications for a second USIM based MT associated with the second USIM; and send a response to the second core network.

In one example, the UE, wherein at least one of the notifications is in the form of at least one of IP-based messaging and radio resource control (RRC)-based page of a pending service delivery for the second USIM based MT.

In one example, the UE, wherein the at least one processor is further configured to execute the computer-executable instructions to: receive a page request of a pending service for the second USIM; wherein the page request is delivered to the second USIM, via a second base station associated with the second core network, by using radio resource control (RRC)-based paging.

In one example, the UE, wherein the page request for the second USIM is received via the second base station by using the RRC-based paging, when an IP connection between the UE and the first core network is not available or based on system configuration and operator preferences.

In one example, the UE, wherein the at least one processor is further configured to execute the computer-executable instructions to: switch radio resources to connect to the second core network, at pre-determined time intervals, to receive the page request using the second USIM; and send a response to page request to the second core network.

In one example, the UE, wherein the at least one processor is further configured to execute the computer-executable instructions to: receive a notification of a pending service delivery for a second USIM based MT associated with the second USIM; wherein the notification is delivered, from the IP-based multi-USIM server or AF, using an IP connection between the IP-based multi-USIM server or AF and the UE.

In one example, the UE, wherein the notification is in the form of an IP multimedia message, an IP-based page, a short message service (SMS), or an IP based protocol notification.

In one example, the UE, wherein the notification is forwarded from the second core network to the IP-based multi-USIM server or AF.

In one example, the UE, wherein the IP-based multi-USIM server or AF sends the notification to the first core network based on IP connectivity information of the UE in the first core network and the UE's ID in the first core network in the first core network stored in the IP-based multi-USIM server or AF, the IP connectivity information comprising an IP address of a gateway to the UE.

In one example, the UE, wherein the at least one processor is further configured to execute the computer-executable instructions to: receive notifications for a second USIM based MT associated with the second USIM, via the first core network, using RRC-based paging based on configuration and profile of the UE stored in at least one of the first core network and the IP-based multi-USIM server or AF.

In one example, the UE, wherein the notifications are forwarded from the second core network to the first core network.

In one example, the UE, wherein the notifications for the second USIM are received through the first USIM.

In one example, the UE, wherein the at least one processor is further configured to execute the computer-executable instructions to: send a response to the second core network using the second USIM.

In one example, the UE, wherein the at least one processor is further configured to execute the computer-executable instructions to: switch radio resources to connect to the second core network at pre-determined time intervals; receive a page request of a pending service delivery for a second USIM based MT associated with the second USIM; wherein the notification is delivered to the second USIM, via a second base station associated with the second core network, using RRC-based paging during at least one of a plurality of pre-determined time intervals.

In one example, the UE, wherein the at least one processor is further configured to execute the computer-executable instructions to: send a response to page request to the second core network.

In one example, the UE, wherein the at least one processor is further configured to execute the computer-executable instructions to: receive a page request of a pending service delivery for a second USIM based MT associated with the second USIM; wherein the page request is delivered to a first USIM based MT associated with the first USIM via an RRC connection between the first USIM and a first base station associated with the first core network.

In one example, the UE, wherein the at least one processor is further configured to execute the computer-executable instructions to: after receiving the page request, switch radio resources to connect to the second core network to initiate a page response using the second USIM through an access procedure to a second base station associated with the second core network.

In one example, the UE, wherein the at least one processor is further configured to execute the computer-executable instructions to: receive a notification of a pending service delivery for a second USIM based MT associated with the second USIM; wherein the notification is delivered from the IP-based multi-USIM server.

In one example, the UE, wherein the at least one processor is further configured to execute the computer-executable instructions to: initiate a response to the notification by the second USIM through an access procedure to a second base station associated with the second core network.

In one example, the UE, wherein the first core network includes a fifth generation (5G) new radio (NR) core network.

In one example, the UE, wherein the second core network includes a Long-Term Evolution (LTE) network or a Universal Mobile Telecommunications Service (UMTS) Terrestrial Radio Access Network (UTRAN).

In one example, the UE, wherein the first USIM belongs to a first Public Land Mobile Network (PLMN), and the second USIM belongs to a second PLMN.

In one example, the UE, wherein the first PLMN and the second PLMN are the same.

In one example, the UE, wherein the first PLMN is different from the second PLMN.

In one example, a method by a user equipment (UE) for wireless communication, the method comprising: detecting, by a multiple-universal subscriber identity module (multi-USIM) application of the UE at a Mobile Terminal (MT) level, a presence of a first USIM belonging to a first core network and a second USIM belonging to a second core network; sending an Internet Protocol (IP)-based multi-USIM registration message to an IP-based multi-USIM server or Application Function (AF); wherein the IP-based multi-USIM registration message comprises at least one of: an indication of the presence of the first and second USIMs, information pertaining to identification, connectivity and preference information of the UE, and capabilities associated with the first and the second USIMs.

In one example, the method, further comprising: receiving network broadcast information regarding support of the IP-based multi-USIM server or AF from a first base station associated with the first core network.

In one example, the method, further comprising: performing an IP-based discovery of the IP-based multi-USIM server or AF using at least one of an IP-based protocol and a $3^{rd}$ Generation Partnership Project (3GPP)-based protocol.

In one example, the method, further comprising: receiving an access stratum (AS) and non-access stratum (NAS) UE capability update request from a first base station associated with the first core network; sending a UE capability update response to the first base station for updating the UE's AS and NAS capabilities.

In one example, the method, further comprising: receiving an IP-based M-USIM registration success message from the IP-based multi-USIM server or AF.

In one example, the method, further comprising: receiving a notification of a pending service delivery for a second USIM based MT associated with the second USIM; wherein the notification is delivered, via the first core network, using an IP connection between the IP-based multi-USIM server or AF and the UE.

In one example, the method, wherein the notification is in the form of an IP multimedia message, an IP-based page, a short message service (SMS), or an IP-based protocol notification.

In one example, the method, wherein the notification is forwarded from the second core network to the first core network.

In one example, the method, wherein the notification is forwarded from the second core network to the IP-based multi-USIM server or AF which forwards the notification to the first core network.

In one example, the method, wherein: the notification is forwarded from the second core network to the first core network; and the second core network obtains IP connectivity information of the UE in the first core network and the UE's ID in the first core network from the IP-based multi-USIM server or AF, the IP connectivity information comprising an IP address of a gateway to the UE.

In one example, the method, further comprising: switching radio resources to connect to the second core network, at pre-determined time intervals configured during the UE's power-up, to receive notifications for a second USIM based MT associated with the second USIM; and sending a response to the second core network.

In one example, the method, wherein at least one of the notifications is in the form of at least one of IP-based messaging and radio resource control (RRC)-based page of a pending service delivery for the second USIM based MT.

In one example, the method, further comprising: receiving a page request of a pending service for the second USIM; wherein the page request is delivered to the second USIM, via a second base station associated with the second core network, by using radio resource control (RRC)-based paging.

In one example, the method, wherein the page request for the second USIM is received via the second base station by using the RRC-based paging, when an IP connection between the UE and the first core network is not available or based on system configuration and operator preferences.

In one example, the method, further comprising: switching radio resources to connect to the second core network, at pre-determined time intervals, to receive the page request using the second USIM; and sending a response to page request to the second core network.

In one example, the method, further comprising: receiving a notification of a pending service delivery for a second USIM based MT associated with the second USIM; wherein the notification is delivered, from the IP-based multi-USIM server or AF, using an IP connection between the IP-based multi-USIM server or AF and the UE.

In one example, the method, wherein the notification is in the form of an IP multimedia message, an IP-based page, a short message service (SMS), or an IP based protocol notification.

In one example, the method, wherein the notification is forwarded from the second core network to the IP-based multi-USIM server or AF.

In one example, the method, wherein the IP-based multi-USIM server or AF sends the notification to the first core network based on IP connectivity information of the UE in the first core network and the UE's ID in the first core network in the first core network stored in the IP-based multi-USIM server or AF, the IP connectivity information comprising an IP address of a gateway to the UE.

In one example, the method, further comprising: receiving notifications for a second USIM based MT associated with the second USIM, via the first core network, using RRC-based paging based on configuration and profile of the UE stored in at least one of the first core network and the IP-based multi-USIM server or AF.

In one example, the method, wherein the notifications are forwarded from the second core network to the first core network.

In one example, the method, wherein the notifications for the second USIM are received through the first USIM.

In one example, the method, further comprising: sending a response to the second core network using the second USIM.

In one example, the method, further comprising: switching radio resources to connect to the second core network at pre-determined time intervals; receiving a page request of a pending service delivery for a second USIM based MT associated with the second USIM; wherein the notification is delivered to the second USIM, via a second base station associated with the second core network, using RRC-based paging during at least one of a plurality of pre-determined time intervals.

In one example, the method, further comprising: sending a response to page request to the second core network.

In one example, the method, further comprising: receiving a page request of a pending service delivery for a second USIM based MT associated with the second USIM; wherein the page request is delivered to a first USIM based MT associated with the first USIM via an RRC connection between the first USIM and a first base station associated with the first core network.

In one example, the method, further comprising: after receiving the page request, switching radio resources to connect to the second core network to initiate a page response using the second USIM through an access procedure to a second base station associated with the second core network.

In one example, the method, further comprising: receiving a notification of a pending service delivery for a second USIM based MT associated with the second USIM; wherein the notification is delivered from the IP-based multi-USIM server.

In one example, the method, further comprising: initiating a response to the notification by the second USIM through an access procedure to a second base station associated with the second core network.

In one example, the method, wherein the first core network includes a fifth generation (5G) new radio (NR) core network.

In one example, the method, wherein the second core network includes a Long-Term Evolution (LTE) network or a Universal Mobile Telecommunications Service (UMTS) Terrestrial Radio Access Network (UTRAN).

In one example, the method, wherein the first USIM belongs to a first Public Land Mobile Network (PLMN), and the second USIM belongs to a second PLMN.

In one example, the method, wherein the first PLMN and the second PLMN are the same.

In one example, the method, wherein the first PLMN is different from the second PLMN.

In one example, an Internet Protocol (IP)-based multiple-universal subscriber identity module (multi-USIM) server or Application Function (AF) comprising: one or more non-transitory computer-readable media having computer-executable instructions embodied thereon; at least one processor coupled to the one or more non-transitory computer-readable media, and configured to execute the computer-executable instructions to: receive an IP-based multi-USIM registration message from a user equipment (UE); wherein the P-based multi-USIM registration message comprises at least one of: an indication of the presence of a first USIM and a second USIM, pinformation pertaining to identification, connectivity and preference information of the UE, and capabilities associated with the first and the second USIMs.

In one example, the IP-based multi-USIM server or AF, wherein the at least one processor is further configured to execute the computer-executable instructions to: receive an IP-based discovery request from the UE using at least one of an IP-based protocol and a $3^{rd}$ Generation Partnership Project (3GPP)-based protocol.

In one example, the IP-based multi-USIM server or AF, wherein the at least one processor is further configured to execute the computer-executable instructions to: send an IP-based M-USIM registration success message to the UE.

In one example, the IP-based multi-USIM server or AF, wherein the at least one processor is further configured to execute the computer-executable instructions to: receive a notification of a pending service delivery for a second USIM based MT associated with the second USIM; provide routing information to at least one of the first core network and the second core network to send the notification to the UE.

In one example, the IP-based multi-USIM server or AF, wherein the notification is in the form of an IP multimedia message, an IP-based page, a short message service (SMS), or an IP-based protocol notification.

In one example, the IP-based multi-USIM server or AF, wherein the notification is delivered, via the first core network, using an IP connection between the IP-based multi-USIM server or AF and the UE.

In one example, the IP-based multi-USIM server or AF, wherein the at least one processor is further configured to execute the computer-executable instructions to: forward the notification to at least one of the first core network and the second core network.

In one example, the IP-based multi-USIM server or AF, wherein the at least one processor is further configured to execute the computer-executable instructions to: provide IP connectivity information of the UE in the first core network and the UE's ID in the first core network to the second core network, the IP connectivity information comprising an IP address of a gateway to the UE.

In one example, the IP-based multi-USIM server or AF, wherein the at least one processor is further configured to execute the computer-executable instructions to: receive a notification of a pending service delivery for a second USIM based MT associated with the second USIM; deliver the notification to the UE using an IP connection between the IP-based multi-USIM server or AF and the UE.

In one example, the IP-based multi-USIM server or AF, wherein the notification is in the form of an IP multimedia message, an IP-based page, a short message service (SMS), or an IP-based protocol notification.

In one example, the IP-based multi-USIM server or AF, wherein the at least one processor is further configured to execute the computer-executable instructions to: provide the notification to the first core network based on IP connectivity information of the UE in the first core network and the UE's ID in the first core network in the first core network stored in the IP-based multi-USIM server or AF, the IP connectivity information comprising an IP address of a gateway to the UE.

In one example, the IP-based multi-USIM server or AF, wherein the at least one processor is further configured to execute the computer-executable instructions to: trigger the first core network or the second network to initiate an RRC-based paging when an IP connection between the UE and the first core network is not available or based on system configuration and operator preferences.

In one example, the IP-based multi-USIM server or AF, wherein the IP-based multi-USIM server or AF stores the IP-based multi-USIM registration message.

In one example, a method by an Internet Protocol (IP)-based multiple-universal subscriber identity module (multi-USIM) server or Application Function (AF), the method comprising: receiving an IP-based multi-USIM registration message from a user equipment (UE); wherein the IP-based multi-USIM registration message comprises at least one of: an indication of the presence of a first USIM and a second USIM, information pertaining to identification, connectivity and preference information of the UE, and capabilities associated with the first and the second USIMs.

In one example, the method, further comprising: receiving an IP-based discovery request from the UE using at least one of an IP-based protocol and a $3^{rd}$ Generation Partnership Project (3GPP)-based protocol.

In one example, the method, further comprising: sending an IP-based M-USIM registration success message to the UE.

In one example, the method, further comprising: receiving a notification of a pending service delivery for a second USIM based MT associated with the second USIM; providing routing information to at least one of the first core network and the second core network to send the notification to the UE.

In one example, the method, wherein the notification is in the form of an IP multimedia message, an IP-based page, a short message service (SMS), or an IP-based protocol notification.

In one example, the method, wherein the notification is delivered, via the first core network, using an IP connection between the IP-based multi-USIM server or AF and the UE.

In one example, the method, further comprising: forwarding the notification to at least one of the first core network and the second core network.

In one example, the method, further comprising: providing IP connectivity information of the UE in the first core network and the UE's ID in the first core network to the second core network, the IP connectivity information comprising an IP address of a gateway to the UE.

In one example, the method, further comprising: receiving a notification of a pending service delivery for a second USIM based MT associated with the second USIM; delivering the notification to the UE using an IP connection between the IP-based multi-USIM server or AF and the UE.

In one example, the method, wherein the notification is in the form of an IP multimedia message, an IP-based page, a short message service (SMS), or an IP-based protocol notification.

In one example, the method, further comprising: providing the notification to the first core network based on IP connectivity information of the UE in the first core network and the UE's ID in the first core network in the first core network stored in the IP-based multi-USIM server or AF, the IP connectivity information comprising an IP address of a gateway to the UE.

In one example, the method, further comprising: triggering the first core network or the second network to initiate an RRC-based paging when an IP connection between the UE and the first core network is not available or based on system configuration and operator preferences.

In one example, the method, wherein the IP-based multi-USIM server or AF stores the IP-based multi-USIM registration message.

Cross Reference

This Nonprovisional application claims priority under 35 U.S.C. § 119 on provisional Application No. 63/012,033 on Apr. 17, 2020, the entire contents of which are hereby incorporated by reference.

What is claimed is:

1. A user equipment (UE) for wireless communication, the UE comprising:
   one or more non-transitory computer-readable media storing computer-executable instructions; and
   at least one processor coupled to the one or more non-transitory computer-readable media, and configured to execute the computer-executable instructions to:
      detect, by a multiple-universal subscriber identity module (multi-USIM) application of the UE at a Mobile Terminal (MT) level, a presence of a first USIM belonging to a first core network and a second USIM belonging to a second core network;
      send an Internet Protocol-based (IP-based) multi-USIM registration message to an IP-based multi-USIM server or Application Function (AF);
      receive an access stratum (AS) and non-access stratum (NAS) UE capability update request from a first base station associated with the first core network; and
      send a UE capability update response to the first base station for updating AS and NAS capabilities of the UE,
   wherein the IP-based multi-USIM registration message comprises at least one of:
      an indication of the presence of the first and second USIMs,
      information pertaining to identification, connectivity, and preference information of the UE, and
      capabilities associated with the first and the second USIMs.

2. The UE of claim 1, wherein the at least one processor is further configured to execute the computer-executable instructions to:
   receive network broadcast information regarding support of the IP-based multi-USIM server or AF from the first base station associated with the first core network.

3. The UE of claim 1, wherein the at least one processor is further configured to execute the computer-executable instructions to:
   receive an IP-based multi-USIM registration success message from the IP-based multi-USIM server or AF.

4. The UE of claim 1, wherein the at least one processor is further configured to execute the computer-executable instructions to:
   receive a notification of a pending service delivery for a second USIM based MT associated with the second USIM;
   wherein the notification is delivered, via the first core network, using an IP connection between the IP-based multi-USIM server or AF and the UE.

5. A method performed by a user equipment (UE) for wireless communication, the method comprising:
   detecting, by a multiple-universal subscriber identity module (multi-USIM) application of the UE at a Mobile Terminal (MT) level, a presence of a first USIM belonging to a first core network and a second USIM belonging to a second core network;
   sending an Internet Protocol-based (IP-based) multi-USIM registration message to an IP-based multi-USIM server or Application Function (AF);
   receiving an access stratum (AS) and non-access stratum (NAS) UE capability update request from a first base station associated with the first core network; and
   sending a UE capability update response to the first base station for updating AS and NAS capabilities of the UE,
   wherein the IP-based multi-USIM registration message comprises at least one of:
      an indication of the presence of the first and second USIMs,
      information pertaining to identification, connectivity, and preference information of the UE, and
      capabilities associated with the first and the second USIMs.

6. An Internet Protocol-based (IP-based) multiple-universal subscriber identity module (multi-USIM) server or Application Function (AF) comprising:
   one or more non-transitory computer-readable media storing computer-executable instructions; and
   at least one processor coupled to the one or more non-transitory computer-readable media, and configured to execute the computer-executable instructions to:
      receive an IP-based multi-USIM registration message from a user equipment (UE);
      send an access stratum (AS) and non-access stratum (NAS) UE capability update request to the UE; and receive a UE capability update response from the UE for updating AS and NAS capabilities of the UE,
wherein the IP-based multi-USIM registration message comprises at least one of:
an indication of the presence of a first USIM and a second USIM,
information pertaining to identification, connectivity, and preference information of the UE, and
capabilities associated with the first and the second USIMs.

* * * * *